Patented Oct. 31, 1944

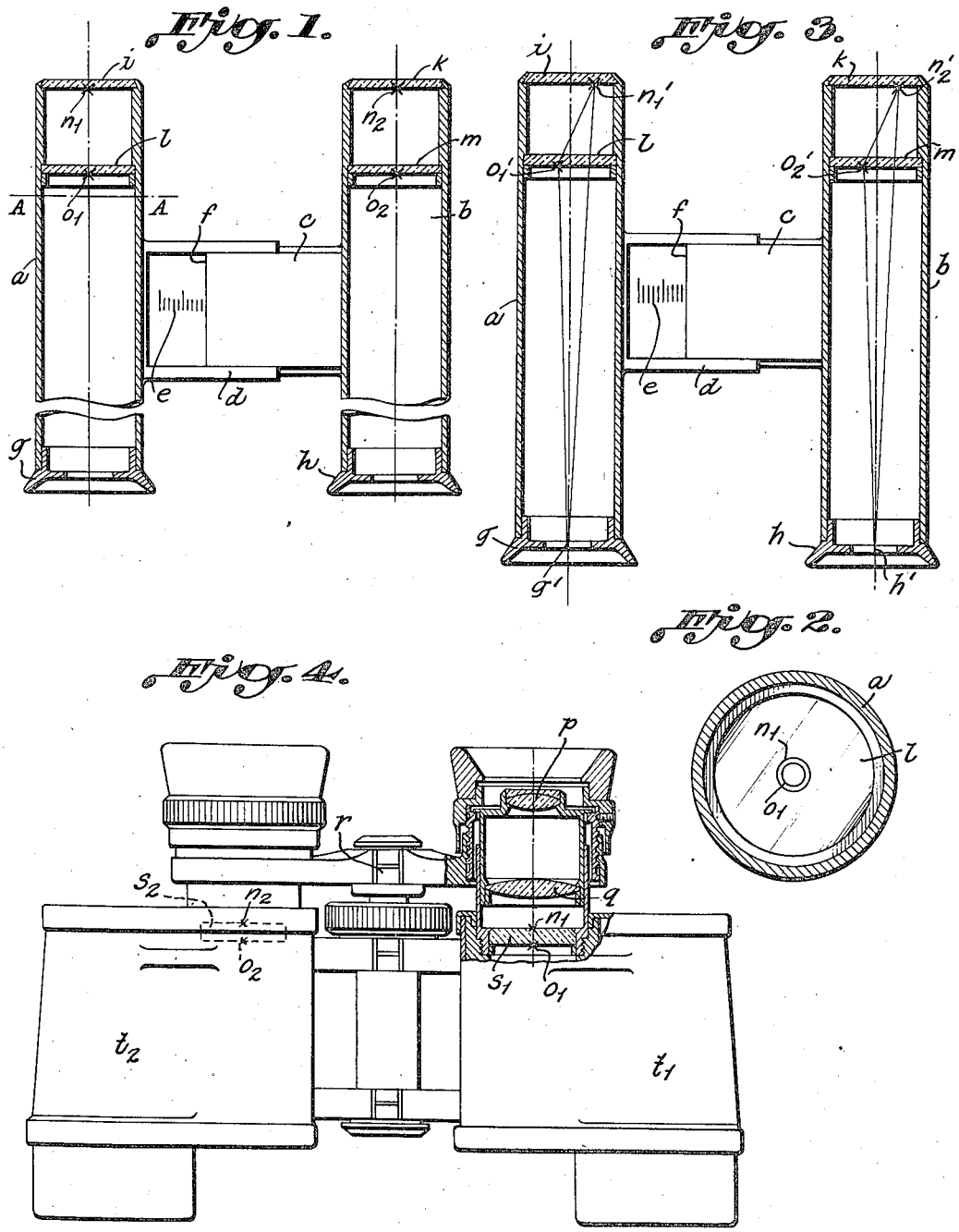

2,361,534

UNITED STATES PATENT OFFICE 2,361,534

INTERPUPILLARY DISTANCE GAUGE

Otto Martin Israel Eppenstein, Jena, Germany; vested in the Alien Property Custodian Application July 30, 1940, Serial No. 348,349
In Germany July 22, 1939

6 Claims. (Cl. 88—20)

To do satisfactory work with a binocular optical instrument or to obtain a perfectly fitting pair of spectacles it is necessary to know one's own interpupillary distance. The latter usually has been ascertained in the past by determining the distance between the centres of the two black circles representing the pupils by way of comparison with the aid of a rule. This mode of determination is relatively unreliable and often does not satisfy the requirements for accuracy as must be demanded in the operation of precise stereoscopical measuring instruments.

The subject of the present invention is an interpupillary distance gauge which is capable of furnishing readings of essentially greater reliability and which, unlike the known types of these instruments, bases on the principle of determining the relative position of the pupils by their function as those diaphragms limiting the apertures of the pencils of rays entering the eyes. The said limitation is known to determine the position of the images of objects upon which the eye is not sharply focussed by accommodation provided this lack of definition is so small that the positions of the images relative to each other can be clearly perceived. The ray entering an optical system through the centre of the generally axial symmetric entrance pupil is referred to as the principal ray. All points lying on a principal ray of the eye and which are still clearly perceivable superpose each other, so that points will be seen in coincidence if the extended line connecting two of these points located different distances away from the eye passes through the centre of the pupil. If a pair of points is presented to each eye and if the connecting line of one pair is parallel to the connecting line of the other pair, the distance between the parallel connection lines—measured at right angles to the line of vision—being equal to the interpupillary distance, and furthermore if by means of stereoscopic vision one point each of a pair is fused with a point of the other pair to form two stereoscopic points, both points appear equidistant from the observer. However, the latter distances of the two points from the observer appear to be different if the aforesaid condition is not satisfied.

The interpupillary distance gauge according to the invention comprises two tubes parallel to each other with variable distance apart, two marks being provided in either tube behind each other in such a manner that the two triangles whose corner points are determined by the axial point of the viewing aperture of each tube and by the two respective marks, are congruent and that their corresponding sides are parallel. The interpupillary distance is equal to the distance between the two tube-axes if the two marks stereoscopically observed in the tubes appear to lie in the same distance. Hence, to measure the interpupillary distance it will be necessary to change the distance between the two tubes—which latter ought to be connected with an index and with a correspondingly graduated scale—until the difference in distance of the two stereoscopic marks has disappeared. Obviously, this aim can be arrived at not only when the two marks of each tube lie on the axis of the tube, i. e., if the marks superpose when the principal ray reaching the eye coincides with the axis of the tube, but also when the angular differences of the two marks are identical in size and sense in both tubes and when—to obtain a stereoscopic effect at all—they lie in parallel planes. The tubes only being an auxiliary means for bringing the eyes into a certain position relative to the marks when using the instrument, a similar instrument without the said tubes will be just as useful if other means are adopted whereby the said parts are made to occupy the position required for measuring. The shape of the marks themselves is immaterial. When working with the type of superposed marks or, in other words, if the said angular differences—i. e., the angles of the said triangles whose vertices lie in the ocular apertures—are of zero angular values, it will be advisable to use in each tube two marks which—to indicate their centres—consist of two concentric circles of different diameters, in preference to other shapes of marks, as cross lines or arrow-marks, for instance.

To prevent sections of the landscape visible through the tubes from irritating the operator of the interpupillary distance gauge, it will be expedient to close the ends of the tubes opposite the viewing apertures by discs diffusing the entering light, while those surfaces of the disc facing the interior of the tubes may be used at the same time, each carrying one of the marks.

A particularly suitable model of interpupillary distance gauge is obtained if the viewing apertures of the tubes are closed by means of magnifiers and if the marks are provided for near the focal planes of the respective magnifiers. With the said magnifiers representing eyepieces of a binocular observing instrument, such as of a pair of fieldglasses, or of a rangefinder, etc., for instance, the above form of instrument will be advantageous in that the eyepiece-distance can be properly set without the necessity of having to make a numerical determination of the interpupillary distance.

The eyepieces of numerous binocular observing instruments are provided with mark-plates one surface of which coincides with the image plane. Both surfaces therefore lie near the respective eyepiece. In the case of instruments of this kind it will be advantageous to so design the interpupillary distance gauge that the marks are provided for upon the two surfaces of the mark-plates, thus dispensing with the necessity of providing special carriers for the marks required for measuring the interpupillary distance.

In the accompanying drawing two constructional examples of the invention are illustrated. Fig. 1 shows a central longitudinal section of the first example. Fig. 2 shows on an enlarged scale a section along the line A—A of Fig. 1 and Fig. 3 shows a second pattern of the first example in central longitudinal section. Fig. 4 illustrates a binocular field glass equipped in accordance with the present invention, partly in section.

The first constructional example (Figs. 1 and 2) consists of two tubes $a$ and $b$ parallel to one another, one being provided with a slide $c$ and the other with a slideway $d$ which permit changes to be made in the distance separating the tubes while their parallelity is preserved. The slideway $d$ is provided with a millimetre scale $e$ with the edge $f$ of slide $c$ representing the index to the said scale. The viewing apertures of the tubes are provided with eye-cups $g$ and $h$ while the other tube-ends are closed by outside-frosted glass discs $i$ and $k$. Within the tubes clear-glass discs $l$ and $m$ are provided. On the inside surfaces of the frosted discs $i$ and $k$ circles $n_1$ and $n_2$ of equal diameters, and on the rear of the discs $l$ and $m$ smaller circles $o_1$ and $o_2$ also of equal diameters, are provided in such a manner that the centres of the circles lie on the axes of the tubes.

When looking into the tubes $a$ and $b$ the circles $n_1$ and $n_2$ are fused to form a stereoscopic circle, and the circles $o_1$ and $o_2$ to form a stereoscopic circle. If slide $c$ is now displaced in its slideway $d$ until the two stereoscopic circles lie an equal apparent distance away, then the distance between the axes of the tubes corresponds to the interpupillary distance being measured, a reading of which can be taken in numerical values from the scale $e$ using the edge $f$ as an index.

The second pattern (Fig. 3) of the first example is identical with the pattern shown in Figs. 1 and 2, with the sole exception of the arrangement of the marks. Unlike to the arrangement according to Fig. 2 the marks are laterally displaced relative to one another so that the stereoscopic marks produced by their stereoscopic fusion lie side by side in the field of view. The glass discs $i$ and $k$ carry marks $n_1'$ and $n_2'$, and the glass discs $l$ and $m$ marks $o_1'$ and $o_2'$. The axial points of the viewing apertures are designated $g'$ and $h'$. The arrangement of marks made in the tubes $a$ and $b$ is such that the triangle $g'n_1'o_1'$ is congruent to the triangle $h'n_2'o_2'$ and that the corresponding sides of the triangle are parallel to each other. When setting the stereoscopic marks produced by the stereoscopic fusion of the marks $n_1'$ and $n_2'$ as well as of $o_1'$ and $o_2'$ for an equal apparent distance, which is done by displacing slide $c$ in the slideway $d$, a reading of the interpupillary distance looked for is again obtained off the scale $e$, using the edge $f$ as an index.

The design of a field glass (Fig. 4) representing the second example may be assumed as being known as regards those parts not shown in the drawing. The eyepieces of the fieldglass are equipped with achromatic eye lenses $p$ and field lenses $q$ both of which are simultaneously adjustable in the direction of the axis. A joint $r$ serves for adjusting the eyepiece distance. Near the focal planes of the eyepiece glass discs $s_1$ and $s_2$ are fitted which on both of their surfaces carry circular marks $n_1$, $n_2$ and $o_1$, $o_2$, respectively, according to the first constructional example.

The eyepieces of the fieldglass having been so focussed that the images of all circles appear uniformly sharp the two fieldglass-bodies $t_1$ and $t_2$ are swivelled about the joint $r$ until the apparent distances of the stereoscopic marks $n$ and $o$ produced by the stereoscopic fusion of the marks $n_1n_2$, and $o_1o_2$, respectively, are equal, thus indicating that the axial distance of the eyepieces is equal to the interpupillary distance. A numerical determination of the interpupillary distance can be dispensed with as the fieldglass can be readily used now for its specific purpose. The images of the object produced by the objectives of the fieldglasses are not required to lie in one of the surfaces of the glass plates $s_1$ and $s_2$. However, when observing the object, the said surfaces must coincide with the image planes and must be sharply depicted by means of the eyepieces if in addition to the circular marks they carry further marks to be used in observing the object. In the event of the eyepieces being adjustable within an adequately large range it will be possible to so attach the glass discs that when focusing the eyepiece the marks will appear in sharp definition near one end of the focusing range, while the image of the object is sharply depicted near the other end. In doing so the marks which serve for determining the interpupillary distance are not perceived during the observation of the object and do not therefore interfere with the said observation.

I claim:

1. An interpupillary distance gauge containing two tubes provided with viewing apertures, the axes of said tubes being parallel to each other and the distance between the tubes variable, each tube being provided with two marks lying behind each other, the distances apart of the two marks in the said tubes being equal, the triangles determined in either tube by the two marks and by the point of the viewing aperture on the tube-axis being congruent.

2. An interpupillary distance gauge containing two tubes provided with viewing apertures, the axes of the said tubes being parallel and the distance between the tubes variable, each tube being provided with two transparent plates lying behind each other and having a mark disposed on it, the distances apart of the two plates in the two tubes being equal, the triangles determined in either tube by the two marks and by the point of the viewing aperture on the axis being congruent.

3. In an interpupillary distance gauge according to claim 2, two of the said plates being dispersive to light and closing those ends of the two said tubes opposite the viewing apertures.

4. In an interpupillary distance gauge according to claim 2, the lines connecting the point of the viewing aperture on the axis of the tube with the two marks coinciding in each of the said tubes.

5. In an interpupillary distance gauge according to claim 2, two magnifiers, each of these magnifiers closing the viewing aperture of one of the said tubes, the said marks being provided for in the proximity of the focal planes of the said magnifiers, respectively.

6. The combination of a binocular observation instrument containing two tubes equipped with eyepieces, the distance between the said eyepieces being variable, and a device for adjusting the said distance in accordance with the interpupillary distance of the observer said combination comprising two transparent plates of equal thickness, each of these plates being disposed near the focal plane of one of the said eyepieces, the surfaces of the said plates being parallel to the said focal planes, each of the said plates being provided on either of its surfaces with a mark lying on the optic axis.

OTTO MARTIN ISRAEL EPPENSTEIN.